US011179707B2

(12) United States Patent
Bauer et al.

(10) Patent No.: US 11,179,707 B2
(45) Date of Patent: Nov. 23, 2021

(54) COMPOSITE MATERIAL

(71) Applicant: Johnson Matthey Catalysts (Germany) GmbH, Redwitz an der Rodach (DE)

(72) Inventors: Juergen Bauer, Redwitz an der Rodach (DE); Ralf Dotzel, Redwitz an der Rodach (DE); Joerg Werner Muench, Redwitz an der Rodach (DE); Ralitsa Purova, Erlangen (DE); Wilhelm Schwieger, Erlangen (DE); Thangaraj Selvam, Erlangen (DE); Ameen Shahid, Erlangen (DE)

(73) Assignee: Johnson Matthey Catalysts (Germany) GmbH, Redwitz an der Rodach (DE)

( * ) Notice: Subject to any disclaimer, the term of this patent is extended or adjusted under 35 U.S.C. 154(b) by 0 days.

(21) Appl. No.: 16/876,884

(22) Filed: May 18, 2020

(65) Prior Publication Data

US 2021/0094025 A1  Apr. 1, 2021

Related U.S. Application Data

(60) Division of application No. 16/498,479, filed on Sep. 27, 2019, now Pat. No. 10,828,626, which is a continuation of application No. PCT/GB2018/050870, filed on Mar. 29, 2018.

(30) Foreign Application Priority Data

Mar. 31, 2017 (GB) ..................... 1705235

(51) Int. Cl.
| B01J 29/76 | (2006.01) |
| B01D 53/94 | (2006.01) |
| B01J 35/04 | (2006.01) |
| B01J 37/00 | (2006.01) |
| B01J 37/10 | (2006.01) |
| B01J 37/30 | (2006.01) |
| F01N 3/022 | (2006.01) |
| F01N 3/035 | (2006.01) |
| F01N 3/20 | (2006.01) |
| F01N 3/28 | (2006.01) |

(52) U.S. Cl.
CPC ........ *B01J 29/763* (2013.01); *B01D 53/9418* (2013.01); *B01J 35/04* (2013.01); *B01J 37/0018* (2013.01); *B01J 37/10* (2013.01); *B01J 37/30* (2013.01); *F01N 3/0224* (2013.01); *F01N 3/035* (2013.01); *F01N 3/2066* (2013.01); *F01N 3/2828* (2013.01); *B01D 2255/20738* (2013.01); *B01D 2255/20761* (2013.01); *B01D 2255/50* (2013.01); *B01D 2255/9155* (2013.01); *B01D 2255/9202* (2013.01); *B01D 2255/9205* (2013.01); *B01J 2229/186* (2013.01); *B01J 2229/38* (2013.01); *F01N 2370/04* (2013.01); *F01N 2510/063* (2013.01)

(58) Field of Classification Search
CPC ... B01J 37/0018; B01J 29/763; F01N 3/0224; F01N 3/2066; F01N 3/2828; B01D 2255/50; B01D 2255/9202
USPC ................................. 523/702, 705
See application file for complete search history.

(56) References Cited

U.S. PATENT DOCUMENTS

| 4,961,917 | A | 10/1990 | Byrne | |
| 5,976,490 | A * | 11/1999 | Wendelbo | B01J 39/14 423/712 |
| 6,620,402 | B2 * | 9/2003 | Jacobsen | B01J 29/0308 423/705 |
| 8,658,127 | B2 * | 2/2014 | Holland | B01J 35/0013 423/700 |
| 10,376,867 | B2 | 8/2019 | Blakeman et al. | |
| 10,525,412 | B2 | 1/2020 | Chen et al. | |
| 10,569,264 | B2 | 2/2020 | Bauer et al. | |
| 10,682,626 | B2 * | 6/2020 | Hedlund | B01D 71/028 |
| 2002/0183407 | A1 * | 12/2002 | Yoon | C01B 39/40 521/50 |

(Continued)

FOREIGN PATENT DOCUMENTS

| CN | 102614910 A | 8/2012 |
| CN | 106145139 A | 11/2016 |

(Continued)

OTHER PUBLICATIONS

PCT/GB2018/050870, International Search Report dated Jun. 19, 2018.

(Continued)

*Primary Examiner* — Tom P Duong
(74) *Attorney, Agent, or Firm* — BakerHostetler

(57) ABSTRACT

A composite material comprises a macroporous silicate-based material at least partially substituted with at least one microporous zeolite, wherein the microporous zeolite is functionalised with either copper, iron or both copper and iron, and wherein the composite material is in the form of particles. The composite material can be obtained using a method comprising the steps of: (i) providing a mixture comprising a silicate-containing scaffold having a macroporous structure, an aluminium source and an organic template; (ii) hydrothermally treating the mixture to form a microporous zeolite-containing structure substantially retaining the macroporous structure of the silicate-containing scaffold; (iii) incorporating copper, iron or both copper and iron into the zeolite. The silicate-containing scaffold can be a diatomaceous earth.

11 Claims, 7 Drawing Sheets

(56) References Cited

U.S. PATENT DOCUMENTS

| | | |
|---|---|---|
| 2010/0290963 A1 | 11/2010 | Andersen et al. |
| 2011/0120910 A1* | 5/2011 | Simon .................... C10G 45/64 |
| | | 208/60 |
| 2011/0315660 A1* | 12/2011 | Yu .......................... B82Y 30/00 |
| | | 216/56 |
| 2012/0014865 A1 | 1/2012 | Bull et al. |
| 2012/0014866 A1 | 1/2012 | Bull et al. |
| 2012/0014867 A1 | 1/2012 | Bull et al. |
| 2012/0201731 A1 | 8/2012 | Ballinger et al. |
| 2012/0208691 A1 | 8/2012 | Bull et al. |
| 2012/0275977 A1 | 11/2012 | Chandler et al. |
| 2014/0007493 A1* | 1/2014 | Henry ..................... C10G 1/086 |
| | | 44/307 |
| 2014/0186251 A1* | 7/2014 | Tissler ................ B01D 53/8687 |
| | | 423/245.1 |
| 2014/0328738 A1 | 11/2014 | Chandler et al. |
| 2015/0078989 A1 | 3/2015 | Fedeyko et al. |
| 2015/0290632 A1 | 10/2015 | Lambert et al. |
| 2016/0009618 A1* | 1/2016 | Corcoran, Jr. .......... B01D 53/02 |
| | | 518/714 |
| 2016/0129429 A1* | 5/2016 | Kegnæs ................. B01J 29/043 |
| | | 585/467 |
| 2016/0137516 A1* | 5/2016 | Kegnæs ............... B01J 37/0018 |
| | | 585/467 |

FOREIGN PATENT DOCUMENTS

| | | |
|---|---|---|
| GB | 2527398 A | 12/2015 |
| GB | 2527884 A | 1/2016 |
| GB | 2531859 A | 5/2016 |
| JP | S6328452 A | 2/1988 |
| RU | 2153924 C2 | 8/2000 |
| WO | 9939809 A1 | 8/1999 |
| WO | 2008106519 A1 | 9/2008 |
| WO | 2014027207 A1 | 2/2014 |
| WO | 2015145178 A2 | 10/2015 |
| WO | 2015145181 A1 | 10/2015 |
| WO | 2016016622 A1 | 2/2016 |
| WO | 2016026960 A1 | 2/2016 |

OTHER PUBLICATIONS

PCT/GB2018/050870, Written Opinion dated Jun. 19, 2018.
GB1705235.8, Search Report Under Section 17(5) dated Aug. 31, 2017.

* cited by examiner

Schematic diagram for the synthesis of composite (zeolite chabazite/diatom) for the examples 1 and 2

XRD patterns of diatom, diatom-chabazite composite and standard chabazite (IZA data base).

SEM images of diatom (a) and diatom-chabazite composites (b: Example 1; c: Example 2).

(a)

(b)

(c)

EDX results of diatom (a) and diatom-chabazite composite (b).

| No. | Si | Al | O | Na | Si/Al |
|---|---|---|---|---|---|
| 1 | 25,6 | 0,2 | 74,2 | - | 128 |
| 2 | 26,8 | 0,3 | 72,9 | - | 89 |
| 3 | 23,0 | 0,3 | 76,7 | - | 76 |
| 4 | 19,6 | 6,7 | 69,0 | 2,7 | 3 |
| 5 | 26,2 | 0,2 | 73,6 | - | 131 |
| 6 | 23,8 | 0,2 | 76,0 | - | 119 |

(a)

| No. | Si | Al | O | Na | Si/Al |
|---|---|---|---|---|---|
| 1 | 49,4 | 3,3 | 46 | 0,5 | 15 |
| 2 | 50,5 | 3,2 | 45 | 0,5 | 16 |
| 3 | 50,0 | 3,3 | 45 | 0,5 | 15 |
| 4 | 52,9 | 3,2 | 43 | 0,3 | 17 |
| 5 | 51,4 | 4,1 | 42 | 0,7 | 13 |
| 6 | 46,3 | 3,6 | 48 | 1,2 | 13 |
| 7 | 45,1 | 2,6 | 51 | 0,4 | 17 |
| 8 | 44,2 | 3,2 | 49 | 1,1 | 14 |

(b)

$N_2$-sorption isotherms of diatom and diatom-chabazite composites.

COMPOSITE MATERIAL

This application is a divisional of now-allowed U.S. patent application Ser. No. 16/498,479, filed Sep. 27, 2019, which application is a National Stage of International Patent Application No. PCT/GB2018/050870 filed Mar. 29, 2018, which application claims priority to Great Britain Patent Application No. 1705235.8, filed Mar. 31, 2017. All of the foregoing applications are incorporated herein by reference in their entireties for any and all purposes.

The present invention relates to a composite material. In particular, the present invention relates to a composite material for use as an SCR catalyst.

Hydrocarbon combustion in diesel engines, stationary gas turbines, and other systems generates exhaust gas that must be treated to remove nitrogen oxides ($NO_x$), which comprises NO (nitric oxide), $NO_2$ (nitrogen dioxide) and $N_2O$ (nitrous oxide), with NO being the majority of the $NO_x$ formed. $NO_x$ is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. $NO_x$ needs to be reduced selectively with a catalyst and a reductant in a process known as selective catalytic reduction (SCR) that converts $NO_x$ into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalysed substrate.

Suitable catalysts for SCR known in the art include, for example, $V_2O_5/WO_3$ supported on $TiO_2$ (see WO 99/39809) and transition metal exchanged zeolites (see U.S. Pat. No. 4,961,917 and WO 2008/106519) or a mixture of the two (see WO 2014/027207). When such catalysts are incorporated into an exhaust gas treatment system, the access of species in the exhaust gas (e.g. $NO_x$, $NO_2$, $N_2O$ and $NH_3$) to catalytic sites within the catalyst may be limited. As a result, complete conversion of the exhaust gas to elemental nitrogen and water is typically not achieved.

Accordingly, it is desirable to provide an SCR catalyst in which access to catalytically active sites is improved and/or to tackle at least some of the problems associated with the prior art or, at least, to provide a commercially useful alternative thereto.

WO 2016/016622 discloses a catalyst article and a process for producing the catalyst article. The catalyst can be a catalyst for the selective catalytic reduction of NOx. The process comprises the steps of a) providing functional particles having a catalytically inactive pore former as support surrounded by a layer of a catalytically active material, b) processing the functional particles with further inorganic particles to give a catalytic material, c) thermally treating the catalytic material to form ceramic catalyst, wherein the catalyst comprises at least porous catalytically inactive cells which are formed by the pore formers in the functional particles, which are embedded in a matrix comprising the further inorganic particles which form a porous structure and which are at least partly surrounded by an active interface layer comprising the catalytically active material of the layer of the functional particles.

WO 2015/145181 also discloses a catalyst and a process for producing the catalyst. In the process, an inorganic binder fraction which is catalytically inactive in the starting state and has been treated to develop catalytic activity is mixed into a catalyst composition. The inorganic binder component for the binder fraction can be, in the starting state, a diatomaceous earth. To effect catalytic activation, the individual particles are either coated with a catalytically active layer or transformed into a catalytically active zeolite with maintenance of mesoporosity.

WO 2015/145178 discloses a method of reducing nitrogen oxides in exhaust gas of an internal combustion engine by selective catalytic reduction (SCR) comprising contacting the exhaust gas also containing ammonia and oxygen with a catalytic converter comprising a catalyst comprising at least one crystalline small pore molecular sieve catalytically active component having a maximum ring opening of eight tetrahedral basic building blocks, which crystalline small pore molecular sieve catalytically active component comprises mesopores.

According to a first aspect there is provided a composite material comprising a macroporous silicate-based material (or scaffold) at least partially substituted with at least one microporous zeolite, wherein the microporous zeolite is functionalised with either copper, iron or both copper and iron, and wherein the composite material is in the form of particles.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

Furthermore, the term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

The composite material may exhibit a high level of SCR catalytic activity, and may be suitable for use as an SCR catalyst. Surprisingly, by substituting at least part of macroporous silicate-based material with at least one zeolite, the composite material exhibits a favourable combination of the properties of both the macroporous silicate-based material (i.e. large pores allowing easy access of gaseous species) and the functionalised zeolite (i.e. SCR catalytic activity). As a result, use of the composite material as an SCR catalyst in an exhaust treatment system results in a high level of mass transfer of gaseous species to catalytic sites. Accordingly, a high level of $NO_x$ conversion is achieved.

Furthermore, in comparison to conventional SCR catalysts, it has been surprisingly found that the composite material may exhibit improved selectivity for $N_2O$. Such an effect may be particularly pronounced when the at least one zeolite is functionalised with both copper and iron.

The composite material comprises a macroporous silicate-based material. By "macroporous" it is meant that the material contains pores having a diameter greater than 50 nm. The macropore diameters may be measured, for example, but the use of scanning electron microscopy (SEM) or mercury porosimetry. By "silicate-based" it is meant that the material comprises at least 50 wt. % silicate, typically at least 80 wt. %, more typically at least 90 wt. %. The macroporous silicate-based material may contain species other than silicate such as, for example, metals (e.g. iron) and alumina.

The macroporous silicate-based material is at least partially substituted with at least one microporous zeolite. Preferably, at least 20 wt. % of the macroporous silicate-based material is substituted with the at least one microporous zeolite, more preferably at least 30 wt. %. Lower levels of substitution may result in the composite material exhibiting lower levels of SCR catalytic activity. Preferably, up to 80 wt. % of the macroporous silicate-based material is substituted with the at least one microporous zeolite, more preferably up to 70 wt. %. Higher levels of substitution may not provide any significant increase in SCR catalytic activity, but may result in the composite material exhibiting unfavourable mechanical properties, for example low strength. The level of substitution may be measured using, for example, powder X-ray diffraction or $N_2$ sorption.

By being "substituted" it will be appreciated that the macroporous silicate based material and the microporous zeolite are intimately formed, and are not merely "stuck" together. In other words, the composite material is not merely a mixture of the macroporous silicate based material and the microporous zeolite. Accordingly, there may not be a well-defined boundary between phases of the macroporous silicate-based material and the microporous zeolite, or any such boundary may exhibit a composition gradient between the two phases. By the macroporous silicate based material being "substituted" with the at least one zeolite, it may be considered that the microporous zeolites have undergone a so-called "pseudomorphic crystallisation" (see, for example, Anderson et al, *Journal of Nanoscience and Nanotechnology*, Vol. 5, 92-95, 2005).

Typically, the macroporous silicate-based material is at least partially substituted with just one type of microporous zeolite, but may be substituted with two, three, four or more types of microporous zeolite. The use of two or more types of zeolite may be by design, or may be an inevitable result of reaction conditions employed to carry out the substitution. For example, it is possible that minor fluctuations in the reaction conditions during substitution will result in the formation of a minority "impurity" phase of a zeolite different from the main microporous zeolite phase.

Typically, an outer surface portion of the macroporous silicate-based material is substituted with the microporous zeolite. Substitution may also occur, for example, at surface portions within the macropores of the macroporous silicate-based material.

By "microporous" it is meant that the zeolite contains pores having a diameter of up to 20 nm. The micropore diameters may be measured, for example, but the use of scanning electron microscopy (SEM).

The microporous zeolite is functionalised with copper, iron, or both copper an iron. By "functionalised" it is meant that copper, iron, or both copper and iron has been added to the zeolite structure, for example via ion exchange, impregnation or isomorphous substitution. The microporous zeolite may contain transition metals other than copper and iron such as, for example, one or more of chromium, manganese cobalt, cerium, nickel, zinc, molybdenum, ruthenium, rhodium, palladium, silver, rhenium, iridium and platinum.

The composite material is in the form of particles. As will be apparent, each "particle" will comprise macroporous silicate-based material at least partially substituted with at least one microporous zeolite. The particles (e.g. at least 95% of the particles) may have a longest dimension of, for example, from 3 μm to 1 mm. The longest dimension may be measured, for example, using scanning electron microscopy (SEM). When the particles are in the shape of a sphere, the longest dimension is the diameter of the sphere. The composite material may be in the form of a powder or particulate.

The microporous zeolite is preferably a small pore zeolite containing a maximum ring size of eight tetrahedral atoms. The use of a small pore zeolite may provide an increase is SCR activity in comparison to larger pore zeolites, in particular at low temperatures. Furthermore, small pore zeolites functionalised with either copper, iron or both copper and iron are more resistant to hydrocarbon inhibition than larger pore zeolites, e.g. a medium pore zeolite (a zeolite containing a maximum ring size of 10), such as ZSM-5 or a larger pore zeolite (a zeolite having a maximum ring size of 12), such as Beta. Without being bound by theory, it is considered that small pore zeolites may minimise the detrimental effect of hydrocarbons by means of a molecular sieving effect, whereby small pore zeolites allow NO and $NH_3$ to diffuse to the active sites inside the pores but that the diffusion of hydrocarbon molecules is restricted. In this regard, the kinetic diameter of both NO (3.16 Å) and $NH_3$ (2.6 Å) is smaller than those of the typical hydrocarbons ($C_3H_6$~4.5 Å, n-$C_8H_{18}$~4.30 Å and $C_7H_8$~6.0 Å) present in, for example, diesel engine exhaust. Accordingly, in one embodiment the small pore zeolite has a pore size in at least one dimension of less than 4.3 Å.

The microporous zeolite preferably has a ratio of silica to alumina of from 10:1 to 50:1, more preferably from 15:1 to 30:1. Such zeolites may be capable of undergoing favourable levels of ion exchange with copper, iron or both copper and iron, and may therefore exhibit high levels of SCR catalytic activity following exchange. The ratio of silica to alumina may be measured, for example, by the use of Energy Dispersive X-ray Diffraction (EDX) or inductive coupled plasma (ICP) spectroscopy.

The microporous zeolite is preferably selected from the Framework Type Codes AEI, AFX, CHA, ERI and LEV. Such zeolites may provide the composite material with high levels of SCR catalytic activity.

The microporous zeolite is preferably an aluminosilicate zeolite. Aluminosilicate zeolites are capable of undergoing favourable levels of copper and iron exchange at the alumina sites. Accordingly, following exchange such zeolites may provide the composite material with high levels of SCR catalytic activity. The term "aluminosilicate" as used herein may encompass zeolite structures containing only alumina and silica. In addition, the term "aluminosilicate" as used herein may encompass zeolite structures containing species other than alumina and silica, for example metals (e.g. iron).

In a preferred embodiment, the microporous zeolite comprises chabazite.

The microporous zeolite preferably has a copper to aluminium atomic ratio of from 0.25 to 0.5 based on the zeolite content. Such levels of copper may provide the composite material with high levels of SCR catalytic activity.

The composite material preferably has a pore volume of from 0.05 to 0.25 cm$^3$/g, more preferably from 0.1 to 0.2 cm$^3$/g. Such volumes broadly correspond to the favourable zeolite substitution levels of from 20 to 80 wt. % and 30 to 70 wt. %, respectively. When used as an SCR catalyst in an emission treatment system, lower pore volumes may result in limited mass transfer of nitrogenous reductant and/or exhaust gases to catalytic sites within the composite material. Higher pore volumes may result in the composite material exhibiting unfavourable mechanical properties such as, for example, low strength.

The particles preferably have a longest dimension of from 1 μm to 80 μm, preferably from 5 μm to 40 μm. The longest dimension may be measured, for example, by the use of scanning electron microscopy (SEM). When the particles are in the form of spheres, the longest dimension is the diameter of the sphere. The majority of macropores of the macroporous silicate-based material preferably have a diameter of from 100 nm to 10 μm, preferably from 1 to 10 μm. The diameters may be measured, for example, by the use of scanning electron microscopy (SEM).

The macroporous silicate-based material preferably comprises diatomaceous earth. Diatomaceous earth (also known as diatomite or kieselguhr) is of sedimentary origin consisting mainly of an accumulation of the skeletons formed as a protective covering of diatoms (a group of unicellular algae). The skeletons are essentially amorphous hydrated or opaline silica, but occasionally they are partly composed of alumina and may have a small content of the clay minerals such as illite, kaolite, minerals from the micas group (e.g. muscovite) and organic matter. The typical chemical composition of oven-dried diatomaceous earth is from 80 to 98% silica (preferably 90 to 94% silica), with from 2 to 4% alumina (attributed mostly to clay minerals) and from 0.5 to 2% iron oxide. The shape, porosity and pore sizes of diatomaceous earth result in the composite material exhibiting a combination of favourable mechanical properties and favourable levels of mass transfer of nitrogenous reductant and/or exhaust gases to catalytic sites within the composite material.

The particles may exhibit any shape, for example, spherical, plate-like, cylindrical or rod-like shape. The particles making up the composite material may exhibit the same shape as the underlying macroporous silicate-based material or a different shape therefrom. Preferably, at least some of the particles have cylindrical shape. Typically, at least 50 vol. % of the particles making up the composite material exhibit cylindrical shape, more typically at least 80 vol. %, even more typically at least 95 vol. %.

In a second aspect, the present invention provides a particulate in which at least some of the particles making up the particulate comprise a macroporous silicate-based material at least partially substituted with at least one microporous zeolite, wherein the microporous zeolite is functionalised with either copper, iron or both copper and iron.

The preferable features of the first aspect apply equally to this second aspect.

In a third aspect, the present invention provides a method for the manufacture of a zeolite-containing structure, the method comprising:
(i) providing a mixture comprising a silicate-containing scaffold having a macroporous structure, an aluminium source and an organic template;
ii) hydrothermally treating the mixture to form a microporous zeolite-containing structure substantially retaining the macroporous structure of the silicate-containing scaffold;
iii) incorporating copper, iron or both copper and iron into the zeolite.

The preferable features of the first aspect apply equally to this third aspect. The zeolite-containing structure may be the composite material of the first aspect.

When carrying out the method, typically the shape of the zeolite-containing structure substantially matches the shape of the silicate-containing scaffold. Likewise, the sizes of the macropores of the zeolite-containing structure typically substantially match the sizes of the macropores of the silicate-containing scaffold.

The mixture typically takes the form of an aqueous suspension, for example a slurry. The mixture is typically agitated prior to step (ii) to ensure homogeneity of the mixture. This may result in a more complete hydrothermal reaction during step (ii). The agitation may comprise stirring, for example mechanical stirring. The mixture may be aged prior to step (ii). Particles of a silicate-containing scaffold having a macroporous structure are typically used, e.g. a powder. Step (ii) is typically carried out using an autoclave, more typically a Teflon®-line autoclave. Hydrothermal treatments for the preparation of porous materials are known in the art. Step (iii) may be carried out using techniques known in the art, for example, via the use of via ion exchange, impregnation or isomorphous substitution. Typically, step (iii) is carried out using ion exchange.

The zeolite preferably has a ratio of silica to alumina of 10:1 to 50:1, and the silicate-containing scaffold is essentially the sole source of silicon atoms for the zeolite structure. "Essentially the sole source of silicon atoms for the zeolite structure" means that no source of silicon atoms is intentionally added to the mixture other than the silicate-containing scaffold. Typically, at least 95%, more typically at least 98%, even more typically substantially all of the silicon atoms for the zeolite structure are derived from the silicate-containing scaffold. Addition to the mixture of a source of silicon atoms other than the silicate-containing scaffold may result in the zeolite exhibiting a silica to alumina ratio higher than that specified above. In addition, the resulting material may result in a simple mixture of the silicate-containing scaffold and zeolite, rather than the silicate-containing scaffold being substituted with the zeolite.

The microporous zeolite preferably comprises a chabazite.

A range of silicate-containing scaffolds may be suitable for use in the method, provided that they exhibit a macroporous structure. The silicate-containing scaffold preferably comprises one or more of porous glass, silica gel, and a diatomaceous earth. In a preferred embodiment, the silicate-containing scaffold comprises a diatomaceous earth.

The silicate-containing scaffold preferably comprises a cylindrical structure.

The aluminium source employed will typically depend on the desired zeolite, and will typically be the same as an aluminium source used to prepare the zeolite on its own, i.e. not substituting a silicate-based scaffold. Aluminium sources suitable for a particular zeolite will be known to the skilled person. The aluminium source is typically chosen to be reactive with the silicate-containing scaffold under the reaction conditions of the hydrothermal treatment. The aluminium source preferably comprises sodium aluminate. Sodium aluminate has been found to be particularly effective at substituting the silicate-containing scaffold with zeolite.

The organic template employed will typically depend on the desired zeolite, and will typically be the same as an organic template used to prepare the zeolite on its own, i.e. not substituting a silicate-based scaffold. Organic templates suitable for a particular zeolite will be known to the skilled person. The organic template preferably comprises a cage structure and/or a ring structure, preferably a tricyclo ring structure. Such templates have been found to be particularly effective at substituting the silicate-containing scaffold with zeolite.

In a preferred embodiment, the organic template comprises adamantyl trimethylammonium hydroxide and the microporous zeolite is chabazite.

In step (i) the molar ratio of silicon to aluminium in the mixture is preferably from 5:1 to 25:1.

In step (i) the mixture preferably has a pH greater than 7, preferably 11 to 13.5.

Step (ii) preferably comprises heating the mixture in an autoclave at a temperature of from 140 to 180° C. for a period of from 1 to 7 days. Such conditions are particularly suitable for achieving a favourable level of substitution.

The method may further comprise combining the zeolite-containing structure with an SCR catalyst.

In a fourth aspect, the present invention provides an SCR catalyst composition comprising the composite material as described herein.

In a preferred embodiment, the SCR catalyst composition further comprises a first component comprising the composite material and a second component comprising a vanadium oxide supported on a metal oxide support selected from alumina, titania, zirconia, ceria, silica and mixed oxides or combinations of any two or more thereof, with titania or titania-containing mixed oxides preferred. Such an SCR catalyst composition may exhibit a particularly high SCR catalytic activity. The SCR catalyst composition may take the form of, for example, a blend.

The second component preferably further comprise tungsten oxide and/or iron vanadate.

The weight ratio of the first component to the second component in the SCR catalyst composition is preferably from about 5:95 to about 40:60.

The SCR catalyst composition preferably comprises about 0.5 to about 5 wt. % of the vanadium calculated as $V_2O_5$ based on the total weight of the first component and the second component.

The SCR catalyst composition may take the form of, for example, a washcoat. However, in a preferred embodiment, the SCR catalyst composition takes the form of an extruded, solid, self-supporting substrate, preferably a honeycomb monolith. The washcoat or the extruded substrate may comprise one or more fillers, and/or one or more binders, and/or one or more processing aids, and/or water, and/or one or more dopants.

In a fifth aspect, the present invention provides a catalytic article comprising a substrate (wash)coated with or incorporating (i.e. the abovementioned extruded substrate) the SCR catalyst composition described herein, wherein the substrate is selected from a metal flow-through substrate, a ceramic flow-through substrate, a wall-flow filter, a sintered metal filter, a partial filter and an extruded catalyst honeycomb.

The catalyst article may further comprise a washcoat having a second catalyst composition for selectively reducing $NO_x$ and/or for oxidising $NH_3$.

In a sixth aspect, the present invention provides use of the composite material described herein, the SCR catalyst composition described herein, or the catalytic article described herein in a selective catalytic reduction (SCR) process.

In a seventh aspect, the present invention provides an emission treatment system for treating a flow of a combustion exhaust gas, the system comprising a source of combustion exhaust gas in fluid communication with the SCR catalyst composition described herein, or the catalytic article described herein, and a source of nitrogenous reductant arranged upstream of said SCR catalyst composition or catalytic article. The emission treatment system is preferably the exhaust system of an automotive lean-burn internal combustion engine or a stationary source of $NO_x$, such as a power station or the like.

The present disclosure will now be described in relation to the following non-limiting figures, in which.

Figure 4:
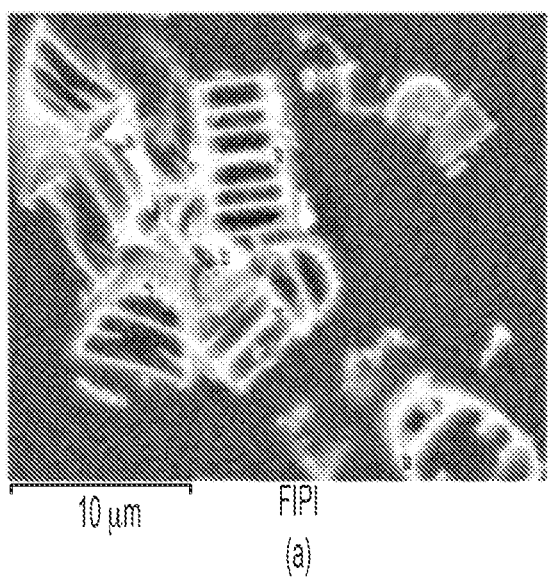
Figure 4:
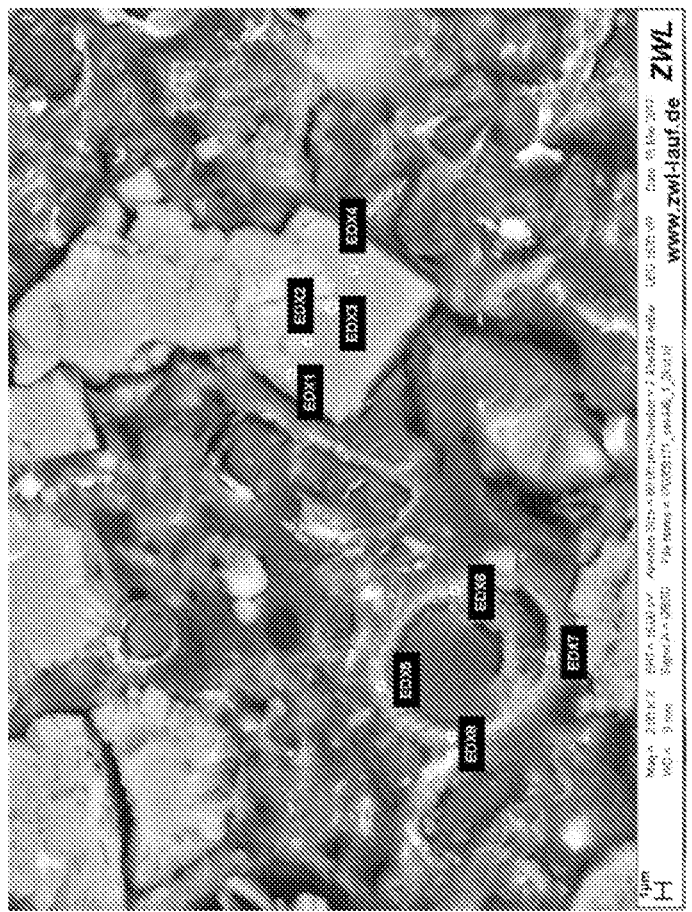
Figure 5:
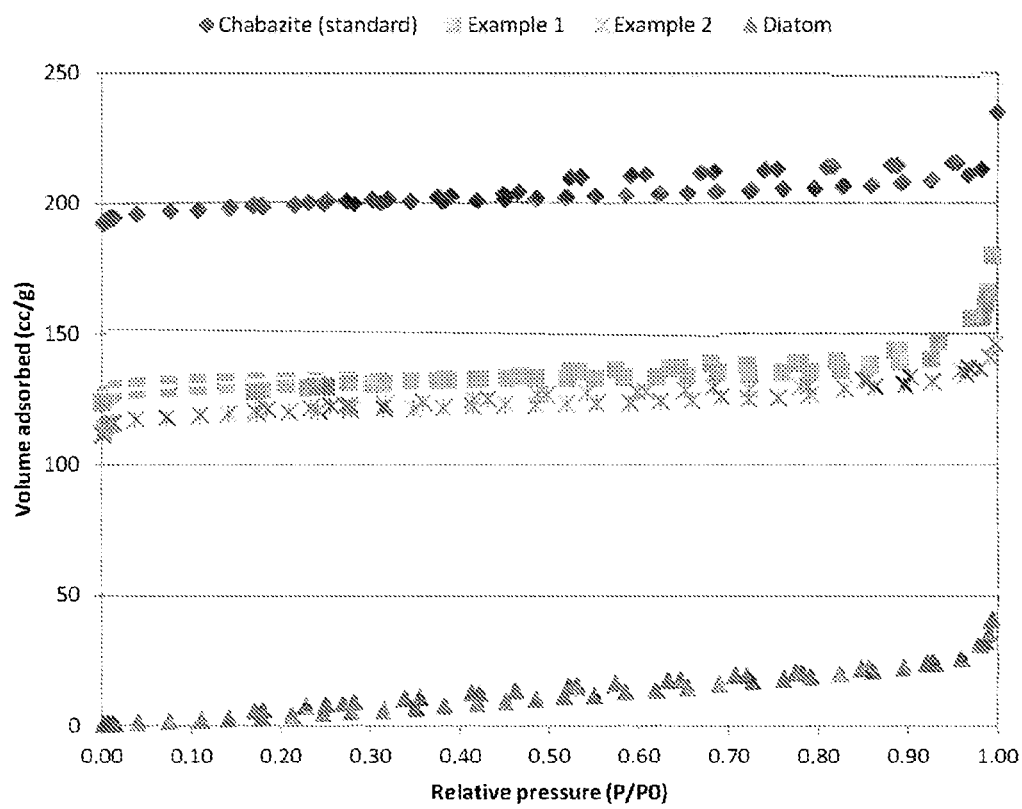

FIG. 4 *a*) and *b*) show EDX results of diatom (comparative); and diatom-chabazite composites according to the invention; and FIG. 5 shows a graph of $N_2$-sorption isotherms of diatom and diatom-chabazite composites according to the invention.

Figure 1:
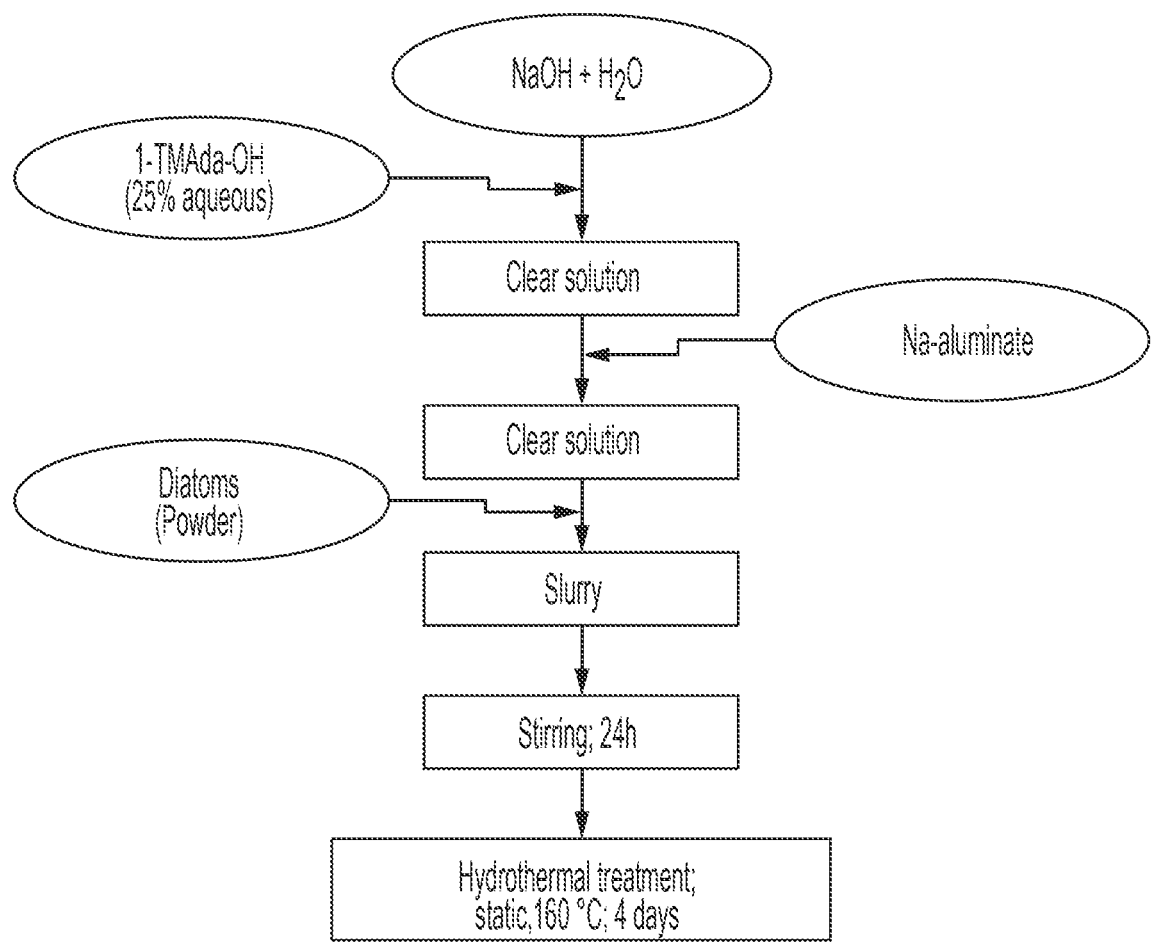
FIG. 1 shows a flowchart of a method according to the present invention.

Referring to FIG. 1 there is shown a method for the manufacture of a zeolite-containing structure, the method comprising: (i) providing a mixture comprising a silicate-containing scaffold having a macroporous structure, an aluminium source and an organic template; (ii) hydrothermally treating the mixture to form a microporous zeolite-containing structure substantially retaining the macroporous structure of the silicate-containing scaffold; (iii) incorporating copper, iron or both copper and iron into the zeolite.

The present disclosure will now be described in relation to the following non-limiting examples.

EXAMPLE 1

Hydrothermal synthesis of a macroporous zeolite (chabazite)-containing composite material was carried out. To a solution of 0.20 g of NaOH in 26.2 g of $H_2O$ was added in succession, under agitation, 6.7 g of TMAda-OH (Adamantyltrimethylammonium hydroxide, 25% solution) and 0.51 g of sodium aluminate (20% $Al_2O_3$, 19.30% $Na_2O$). This mixture was admixed with 2.60 g of kieselguhr (diatomaceous earth, EP Mineral "Celatom™"). The synthesis mixture had the molar composition:

$SiO_2$:0.05 $Al_2O_3$:0.20 TMAda-OH:0.10 $Na_2O$:44 $H_2O$

The synthesis mixture was introduced into a stainless steel autoclaves with a Teflon® container (45 ml). The autoclave was then sealed and maintained for 4 days in a preheated oven at 160° C. The synthesis product was filtered off from the mother liquor, washed with distilled water and then dried at 75° C.

Figure 2:
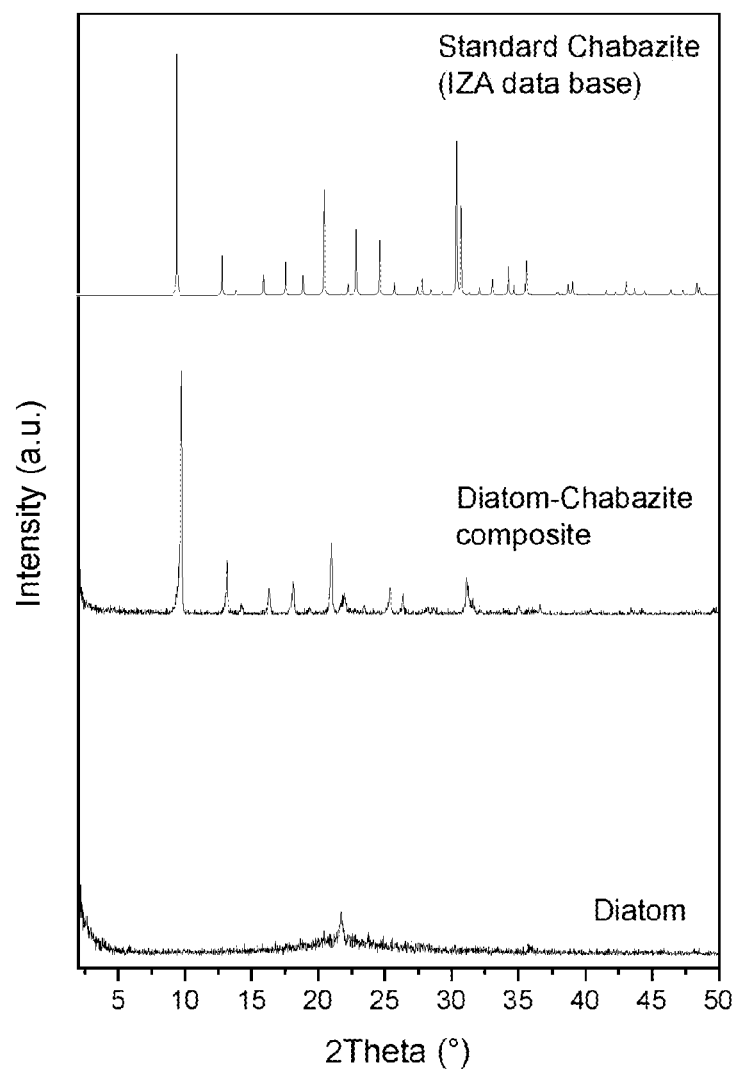
FIG. 2 shows XRD patterns of diatom (comparative), diatom-chabazite composite according to the invention and standard chabazite (comparative; from IZA data base)
Figure 3:
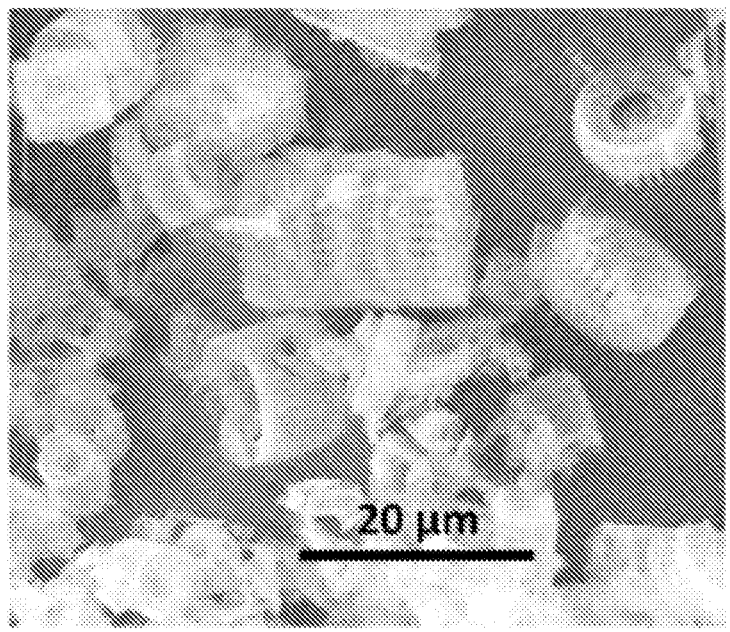
FIG. 3 shows SEM images of: (a) kieselguhr per se, and (b) and (c) composite materials according to the present invention.
Figure 3:
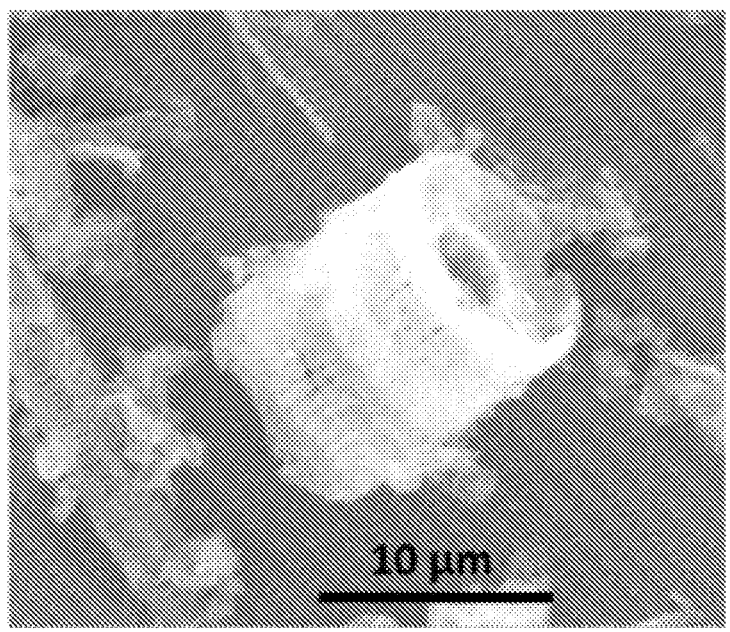
Figure 3:
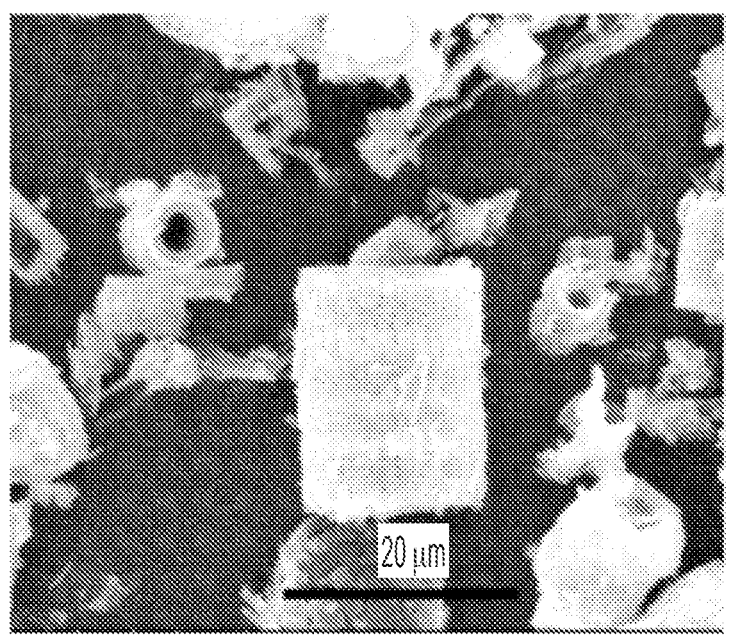

Powder X-ray diffraction indicated that the zeolite chabazite had been formed (see FIG. 2). Scanning electron micrographs indicated that the shape of the kieselguhr had been maintained (see FIG. 3 (*b*)).

EXAMPLE 2

Hydrothermal synthesis of a macroporous zeolite (chabazite)-containing composite material was carried out in a similar manner to Example 1. However, the autoclave was maintained for 4 days in a preheated oven at 160° C.

To determine whether a pseudomorphic transformation had occurred, a sedimentation experiment was carried out. The material was dispersed in water and allowed to slowly settle. After 15 minutes, top, middle and bottom portions of the suspension were separated, filtered and analysed by powder X-ray diffraction. The results indicated that all three portions were the same, suggesting inherent bonding between the zeolite and the support. This was consistent with a pseudomorphic transformation. EDX experiments (see FIG. 4) also indicated a pseudomorphic transformation and a chabazite content of ~28 wt. %.

Scanning electron micrographs of the kieselguhr starting material (FIG. 3(a)) and the chabazite-containing composite material (FIGS. 3(b) and 3(c)) indicated that the shape of the kieselguhr had been maintained.

$^{27}$Al-MAS-NMR spectroscopy was carried out on the material (both as-synthesised and after calcining), and was compared with spectra for kieselguhr. The results indicated that no extra-framework aluminium species (penta- or hexa-coordinated) existed, confirming that in the bulk geometry the macroporosity of the kieselguhr starting material is maintained.

The porosity characteristics of the material were investigated using $N_2$-sorption, and the results are set out below:

TABLE 1

Porosity characteristics.

| Sample | BET surface area $(m^2/g)^a$ | Total pore volume $(cc/g)^a$ | Micropore volume $(cc/g)^a$ | Macroporosity; surface area $(m^2/g)^b$ |
|---|---|---|---|---|
| Kieselguhr | 3 | 0.06 | — | 6.7 |
| Example 1 | 441 | 0.27 | 0.19 | 3.2 |
| Example 2 | 311 | 0.24 | 0.13 | 4.5 |

$^a$$N_2$-sorption measurement;
$^b$Hg-Porosimetry measurement

These values indicate approximately 58-61% of zeolite chabazite (CHA) is present in Example 2, which is consistent with the value of 55% determined by X-ray diffraction.

EXAMPLE 3

Materials were prepared in a similar manner to Example 1 with differing levels of chabazite zeolite content ranging from 20 to 40%. Materials were $NH_4^+$ ion exchanged in a solution of $NH_4NO_3$, then filtered. The resulting materials were added to an aqueous solution of $Cu(NO_3)_2$ with stirring. The slurry was filtered, then washed and dried. The procedure can be repeated to achieve the desired metal loading of 3 wt % (based on the zeolite content). The final product was calcined.

The SCR catalytic activity of the materials was analysed. The following reaction conditions were used:

NO: 500 ppm, $NH_3$: 550 ppm, $O_2$: 8.0% and $H_2O$: 10.0%,
V: 1000 L/g·h (based on composite)

Good levels of $NO_x$ and $NH_3$ conversion were exhibited by the samples tested (see Table 2 below), and increased with increasing chabazite content. The catalytic effect of the samples was found to be particularly high at a temperature of around 400° C.

TABLE 2

| | NOx Conversion | | | |
|---|---|---|---|---|
| | 200° C. | 300° C. | 400° C. | 500° C. |
| 20% Chabazite/Kieselguhr | 11 | 49 | 86 | 87 |
| 40% Chabazite/Kieselguhr | 26 | 89 | 94 | 95 |

A list of the tests carried out on Examples 1-3 are set out below, including tests not mentioned above, together with a summary of their conclusions:

TABLE 3

| Test method | Conclusion |
|---|---|
| X-ray diffraction (XRD) | 28-67% of zeolite (CHA) content is achieved |
| Sedimentation tests | Pseudomorphic transformation |
| SEM | Shape is preserved with a zeolite content of 28-45% |
| Cross-sectional SEM/EDX | Si/Al = 10-43 (Pseudomorphic transformation) |
| ICP analysis | $SiO_2/Al_2O_3$ = 17-20 (Bulk); $SiO_2/Al_2O_3$ = 9-11 (Zeolite) |
| $N_2$-sorption (see FIG. 5) | BET surface area: 433 $m^2g^{-1}$ |
| Hg-Porosimetry | Wide pore-size distribution |
| $NH_3$-SCR | Cu-Chabazite/diatom is catalytically active |
| Scaling-up | Synthesis was scaled up to 1 L autoclave (ca. 100 g product per each run), successful under static condition |

Table 3—Test Summary

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

For the avoidance of doubt, all documents acknowledged herein are incorporated herein by reference.

The invention claimed is:

1. A method for the manufacture of a zeolite-containing structure, the method comprising:
   (i) providing a mixture comprising a silicate-containing scaffold having a macroporous structure, an aluminium source and an organic template;
   ii) hydrothermally treating the mixture to form a microporous zeolite-containing structure substantially retaining the macroporous structure of the silicate-containing scaffold;
   iii) incorporating copper, iron or both copper and iron into the zeolite.

2. The method of claim 1, wherein the zeolite has a ratio of silica to alumina of 10:1 to 50:1, and the silicate-containing scaffold is essentially the sole source of silicon atoms for the zeolite structure.

3. The method of claim 1, wherein the microporous zeolite comprises chabazite.

4. The method of claim 1, wherein the silicate-containing scaffold comprises one or more of porous glass, silica gel, and a diatomaceous earth, preferably wherein the silicate-containing scaffold comprises a diatomaceous earth.

5. The method of claim 1, wherein the silicate-containing scaffold comprises a cylindrical structure.

6. The method of claim 1, wherein the aluminium source comprises sodium aluminate.

7. The method of claim 1, wherein the organic template comprises a cage structure and/or a ring structure, preferably a tricyclo ring structure.

8. The method of claim 1, wherein the organic template comprises adamantyl trimethylammonium hydroxide and the microporous zeolite is chabazite.

9. The method of claim 1, wherein in step (i) the mixture has a pH greater than 7.

10. The method of claim 1, wherein step (ii) comprises heating the mixture in an autoclave at a temperature of from 140 to 180° C. for a period of from 1 to 7 days.

11. The method of claim 1, wherein the zeolite-containing structure is a composite material comprising a macroporous silicate-based material at least partially substituted with at least one microporous zeolite, wherein the microporous zeolite is functionalised with either copper, iron or both copper and iron, and wherein the composite material is in the form of particles.

* * * * *